US009244814B1

(12) United States Patent
Chazan et al.

(10) Patent No.: US 9,244,814 B1
(45) Date of Patent: Jan. 26, 2016

(54) ENRICHED LOG VIEWER

(71) Applicant: Cadence Design Systems, Inc., San Jose, CA (US)

(72) Inventors: Nadav Chazan, Ness Ziona (IL); Noam Garber, Modi'in (IL); Roman (Reuven) Shenkar, Givataim (IL); Tal Tabakman, Tel Aviv (IL); Kalev Alpernas, Modi'in (IL)

(73) Assignee: CADENCE DESIGN SYSTEMS, INC, San Jose, CA (US)

( * ) Notice: Subject to any disclaimer, the term of this patent is extended or adjusted under 35 U.S.C. 154(b) by 91 days.

(21) Appl. No.: 13/926,212

(22) Filed: Jun. 25, 2013

(51) Int. Cl.
*G06F 9/44* (2006.01)
*G06F 11/36* (2006.01)

(52) U.S. Cl.
CPC .................................. *G06F 11/3664* (2013.01)

(58) Field of Classification Search
None
See application file for complete search history.

(56) References Cited

U.S. PATENT DOCUMENTS

2003/0088854 A1* 5/2003 Wygodny et al. ............. 717/130
2004/0205669 A1* 10/2004 Hoidahl ........................ 715/531
2007/0288902 A1* 12/2007 Lev et al. ...................... 717/124
2009/0024986 A1* 1/2009 Meijer .................... G06F 8/437 717/137
2009/0320001 A1* 12/2009 Bates et al. ................... 717/129
2010/0205378 A1* 8/2010 Moyer .......................... 711/146
2010/0275067 A1* 10/2010 Boskovic ................ G06F 11/26 714/45
2012/0198278 A1* 8/2012 Williams et al. ................ 714/30
2013/0283096 A1* 10/2013 Baker .............. G06F 17/30386 714/15
2014/0207917 A1* 7/2014 Tock .................. H04L 41/0893 709/220

OTHER PUBLICATIONS

"Dynamic Object Viewers for Data Structures", Cross et al., Mar. 7-10, 2007.*
"Debugging Dynamic objects in C# Part 1", Feb. 24, 2009, Sree's blog—Site Home—MSDN Blogs.*

* cited by examiner

*Primary Examiner* — Don Wong
*Assistant Examiner* — Daxin Wu
(74) *Attorney, Agent, or Firm* — Pearl Cohen Zedek Latzer Baratz LLP

(57) ABSTRACT

A computer implemented method of debugging with enriched message log capability may include, for each instance during an execution of a program to be debugged in which a message is issued, automatically analyzing the program code included in a scope of the program relating to the message to identify one or a plurality of variables. The method may also include saving on a non-transitory computer readable storage medium a value at that instance of each of said one or a plurality of variables. The method may further include causing a message log that includes the message to be presented on a display device, associating the value of each said one or a plurality of variables with the message.

18 Claims, 4 Drawing Sheets

For each instance during an execution of a program to be debugged in which a message is issued, automatically analyze the program code included in a scope of the program relating to the message to identify one or a plurality of variables
102

Save on a non-transitory computer readable storage medium a value at that instance of each of said one or a plurality of variables
104

100

Cause a message log that includes the message to be presented on a display device, associating the value of each said one or a plurality of variables with the message
106

ENRICHED LOG VIEWER

FIELD OF THE DISCLOSURE

The present disclosure relates to debugging, and more specifically to a method and system for enriched log viewing.

BACKGROUND

Debugging is a methodological process to systematically search for anomalies or discrepancies (hereinafter—anomalies) in a computer program or a hardware design (hereinafter—program) and to fix them after the anomalies are found in the program.

Typically, debugging extends from finding and fixing small errors to lengthy and tedious data collecting, analysis and scheduling updates.

Debugging is a painstaking task that may involve long hours or days of searching for anomalies in a program. It involves human skills and typically depends on the programming language being used and the available debugging tools.

SUMMARY

Disclosed are various embodiments, including a computer implemented method of post process debugging. The method may include, for each instance during an execution of a program to be debugged in which a message is issued, automatically analyzing the program code included in a scope of the program relating to the message to identify one or a plurality of variables. The method may also include saving on a non-transitory computer readable storage medium a value at that instance of each of said one or a plurality of variables. The method may further include causing a message log that includes the message to be presented on a display device, associating the value of each said one or a plurality of variables with the message.

In some embodiments, the one or a plurality of variables may include one or a plurality of dynamic objects.

In some embodiments, the method may further include, when the value includes a dynamic object, recording a value of each field of that dynamic object.

According to embodiments, the recording of the value of each field may be carried out down to a predetermined depth level.

In some embodiments, the method may further include receiving from the user an indication of the depth level.

According to embodiments, the method may further include analyzing the message to identify one or a plurality of variables. The method may also further include saving on a non-transitory computer readable storage medium a value at that instance of each of said one or a plurality of variables. The method may still further include causing a message log that includes the message to be presented on a display device, associating the value of each said one or a plurality of variables with the message.

In some embodiments, the method may further include, upon reaching an error message in the execution, recording a value of each field of all dynamic objects in the program.

According to examples, there is provided a non-transitory computer readable storage medium having stored thereon instructions that when executed by a processor will cause the processor to perform the method of, for each instance during an execution of a program to be debugged in which a message is issued, automatically analyzing the program code included in a scope of the program relating to the message to identify one or a plurality of variables. The method may also include saving on a non-transitory computer readable storage medium a value at that instance of each of said one or a plurality of variables. The method may further include causing a message log that includes the message to be presented on a display device, associating the value of each said one or a plurality of variables with the message.

There is also provided, according to examples, a system that may include a processing unit. The processing unit may be configured to, for each instance during an execution of a program to be debugged in which a message is issued, automatically analyze the program code included in a scope of the program relating to the message to identify one or a plurality of variables, to save on a non-transitory computer readable storage medium a value at that instance of each of said one or a plurality of variables, and to cause a message log that includes the message to be presented on a display device, associating the value of each said one or a plurality of variables with the message.

DETAILED DESCRIPTION

Figure 1:
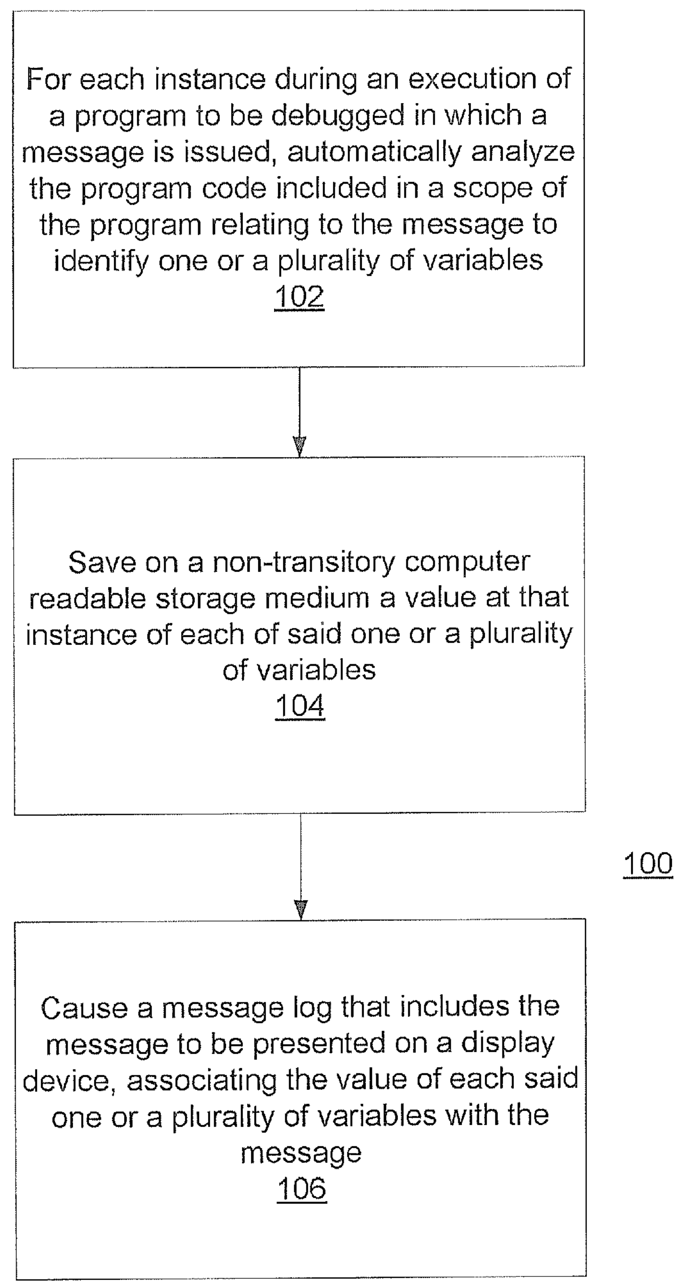
FIG. 1 illustrates a method of debugging according to an example.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

A debugging tool typically allows a programming expert (hereinafter—programmer) to follow the execution of a software program or an electronic hardware design (hereinafter, for the sake of brevity, collectively—program) and detect anomalies. Typically a debugging tool displays a source code or assembly code of the program under test on a user interface (hereinafter referred to as UI). The debugging tool offers various functions, such as performing break point setting, step execution, and the like. For example, in step execution using the UI, the debugging tool executes one or several lines of the source code or one instruction of the assembly code, and if there is a problematic code which leads to an error in a result of execution of the one instruction of the source code or assembly code, the debugging tool highlights a problematic portion or displays an auxiliary code, message, or the like which represents details of the error. The ability to examine an execution of a program step by step helps a human user to find anomalies (bugs) and fix them (debug).

A post-process debugging method was introduced which involves recording a specific program execution and allowing an on-line or off-line analysis of that execution. When recording the execution, all execution events that had occurred in that execution are saved. Information relating to the execution events encountered during an execution is saved (e.g., into a database, memory, etc.), allowing the review of the recorded execution in a user interface while mimicking the look and feel of a regular debugging tool. Thus, the human user (hereinafter—user) can go back and forth (up to the last execution event that was recorded) and view various execution events of that specific execution, including the related information of these events. Using such a post-process debug method allows the user to analyze any execution event and find the execution events that caused it to occur the way it did.

However, recording the entire flow of information associated with the execution can cause the execution to take a substantially longer time, which sometimes may be undesired. Furthermore, the saved information may take up a lot of memory or disk space, which in some cases may be undesired as well.

Users use messages to track the flow and behavior of a program being debugged. A user may learn much about the flow of a specific execution of the program from these messages, and thus most debug sessions typically include the use of such messages.

When users run debug executions, they use message commands to print these messages into a message log. When entering message commands users would manually include variables and fields of dynamic objects of their choice so that when the messages are issued the values of these variables or object fields are printed with the messages at the instances the messages are issued.

The user would sometimes print selected references (these might be pointers, or any other one-to-one identification an object might have—depending on the language) to the dynamic objects and not the entire dynamic objects, with all their fields and values. This is because printing every important field of every important object would lead to a huge log, which would be hard to comprehend. Moreover when debugging in interactive mode, these references are enough to allow the user to access the whole dynamic object and view the values of the object fields.

Users may then typically choose to analyze the results in either a non-interactive mode or in interactive mode.

In a non-interactive mode, the user may only examine the message log files. The user cannot see the value of the different fields of objects that relate to the messages entered by the user, unless all these variables and/or fields were manually included in advance in the message print command entered by the user. The user cannot see the values of variables mentioned in the scope of the subroutine where the message command is found (unless the user specifically adds them as part of the message in advance) The user might be forced to add to the program code, message commands that will print the required variables and/or object fields, and rerun that program in order to learn more about the flow and behavior of the program being debugged.

In an interactive mode, the user may halt the execution, and query the value of different variables and fields in the scope of the current debugger position. In some debuggers and some programming languages the user may query and review the content of different objects mentioned in the message by selecting them, even if he halted the execution outside the scope of the message command that issues that message. Selecting an object (e.g. clicking it using the cursor) typically displays the different fields and values of the object. However, once the interactive session is over, all data is lost and cannot be used for analysis again. It should also be mentioned that if a user halts the run at a certain time and queries an object mentioned in a message issued in an earlier stage or in a different scope—the values he would see are true to the current time, and might not be the same values as they were at the time of that message being issued.

The third way is using Structured Data Messages (SDMs). SDM is a relatively new kind of messages, currently only available in E language, in which a user may select up to two objects per message and specify when entering message commands which of their fields should be recorded while recording an execution of a program to be debugged in post process debugging. The user has to add code in advance indicating which fields of each object are to be recorded. The post process debugger then presents to the user the objects in the message for analysis. This way is linked to and relies on user intervention (in selecting the objects to be recorded, and which of their fields should be recorded), and does not allow saving other variables mentioned in the scope of the message command.

It may be prudent, instead of saving the entire execution information for post process debugging, to save values of variables that relate to messages planted by a user in a program code to be debugged, in order to provide the user with information on these values at instances when these messages are issued (in other words, instances when the program flow has reached message commands issuing these messages).

A method is thus provided, according to examples, for off-line debugging—in fact this is a sort of post-process debugging, but not to be confused with what is generally referred to as "post process debugging". For the sake of brevity it is referred to hereinafter as "enriched message log".

Thus, according to examples, a method for enriched message log is provided. The method may include, for each instance during an execution of a program to be debugged in which a message is issued, automatically analyzing the program code included in a scope of the program relating to the message to identify one or a plurality of variables.

For example, such analyzing may be conducted by way of analyzing (e.g. parsing) the program code in the scope (the "scope" in the context of the present specification, generally relates to the a portion of the code of the program, typically the code of the subroutine in which the message command is located, the code of the block in which the message command is located, etc.) to find a variable or variables being used in that code. Another way is to use the existing syntax tree to find these variables.

In one example, when a message is issued, the debugger may analyze the code around the message command that has issued the message, in order to find all the variables that are mentioned in or used by that code. There may be various ways to analyze the code.

In an example, the message command code may be parsed. In another example, an already existing syntax tree may be traversed. By parsing the code or traversing the syntax tree every variable that is mentioned in the scope where the message command is found may be found. In order to get the value of each such variable, an Eval subroutine that many programming languages supply may be invoked, referring to that variable as the string the subroutine gets.

If the variable is non-primitive, reflection may be used in order to find all the fields relating to that object (e.g. using an Eval subroutine for each of the fields).

In another example, when a message command is issued, referring to the runtime call stack and gather from it all the local variables of the current subroutine and parameters with which the subroutine was called and their values. If any of the variables or parameters are objects, the same scheme as mentioned hereinabove may be used to get their different fields and these fields' values.

"Variable" in the context of the present invention may refer to a local or global variable, to a primitive or non-primitive variable, e.g. an object that includes a field or fields, etc. When such variable or variables are identified, their value at the instance the message is issued is recorded. For each non-primitive variable of the identified variables, all the corresponding fields and their values are also recorded. In the case where a field itself is a non-primitive variable its corresponding fields are recorded too, up to a predetermined depth.

The recorded information relating to the variables and to the corresponding fields of the non-primitive variables may be stored, for example, in an SQL-like database. Storing such information in a database allows database processing actions to be carried out on the data base, such as, for example querying the different objects in message in post-process analysis, analyzing values of objects in different execution instances of the execution.

According to some examples, upon reaching an error message the debugger with enriched message log capability may be configured to record the state (e.g. values) of all the objects that exist in the program, and not only the variables found in the scope of the message command.

After the execution of the program has ended (e.g. halted or otherwise terminated), the user may review a message log, e.g. presented to the user on a display device, where the issued message is displayed for each instance it has issued with the value or values at that instance of the variable (or variables) identified.

Based on the saved information the user may be shown all the instances in which a message command in a given code line has caused a message to be issued, and what were the values of the variables, parameters and/or other fields in the scope for that code line for each instance. A debugger with enriched message log capability may record all the messages that were printed while running the program, and may have a specially designated graphical user interface (GUI) that presents these messages and allows filtering them in one or various ways.

A dynamic object is a program container representing a task, action or data structure that may be used during the execution of the program. The dynamic object may contain a set of fields and functions. Dynamic objects are created and destroyed on the fly during the execution of the program. Once a dynamic object is created the program allocates a memory for the object and gets a pointer to the place in the memory that holds the object. When the dynamic object is not needed anymore the program discards the pointer to the memory and the dynamic object cannot be accessed anymore, allowing the freed memory to be used for different purposes. Even if an object was not "freed" or "destroyed" the values of some or all of its fields may change during the execution. If that happens the user will not be able to know at some later time what the value of each field was at an earlier time during the execution. Thus saving the values of dynamic object, referred to in by a message for each instance a message is issued allows the user to follow the changes in these values and assist the user in understanding the execution flow of the program A message may sometimes contain a reference to a dynamic object, even when that dynamic object was not directly referred to in the code of the message command. In the following message command: message("The current object is", current_obj, "and the next object will be", get_next_object( )). There is a direct reference only to the object called 'current_obj'. However when the message command is executed, the following message is issued: "The current object is my_obj@122 and the next object will be my_obj@771". In order to be able to capture the second object referred to by the message, the text of the issued message is parsed to identify dynamic objects mentioned in it, and for which a reference was not already found. For each such object, the corresponding fields are recorded. In the case where a field itself holds a dynamic object its corresponding fields are recorded too, up to a predetermined depth.

A practical approach to debugging with enriched message log may be implemented according to examples. A debugger with enriched message log capability may be configured to record only log information during an execution of a program being debugged, that would include messages issued to the log during the execution and information relating to variables in scopes in which code lines referred to by these messages, as well as fields corresponding to these variables. In some examples, information relating to all of the objects in the program may be recorded upon reaching an error message. This lets the user investigate the whole state of the program at the time of the error, offering a lot of information to the user and giving the user a hint of what is wrong and where to start debugging.

Recording just message log information has a relatively minimal toll in terms of using up computing power resources, leaving practically no impact on the runtime of the program being executed, as opposed to saving all information relating to the execution of the program.

Reference is made to the accompanying figures.

FIG. 1 illustrates a method of debugging with enriched message log capability according to an example.

Method 100 may include, for each instance during an execution of a program to be debugged in which a message is issued, automatically analyzing 102 the program code included in a scope of the program relating to the message to identify one or a plurality of variables. Method 100 may also include saving 104 on a non-transitory computer readable storage medium a value at that instance of each of said one or a plurality of variables. Method 100 may further include causing 106 a message log that includes the message to be presented on a display device, associating the value of each said one or a plurality of variables with the message.

If any of the variables identified include a dynamic object or objects, in which a field or fields of that object or objects relate to another object, then, according to an example, the field or fields of that object are saved as well. In the context of the present disclosure this is considered as another level. The depth level of recording (how many levels are to be recorded) may be predetermined.

Figure 2:
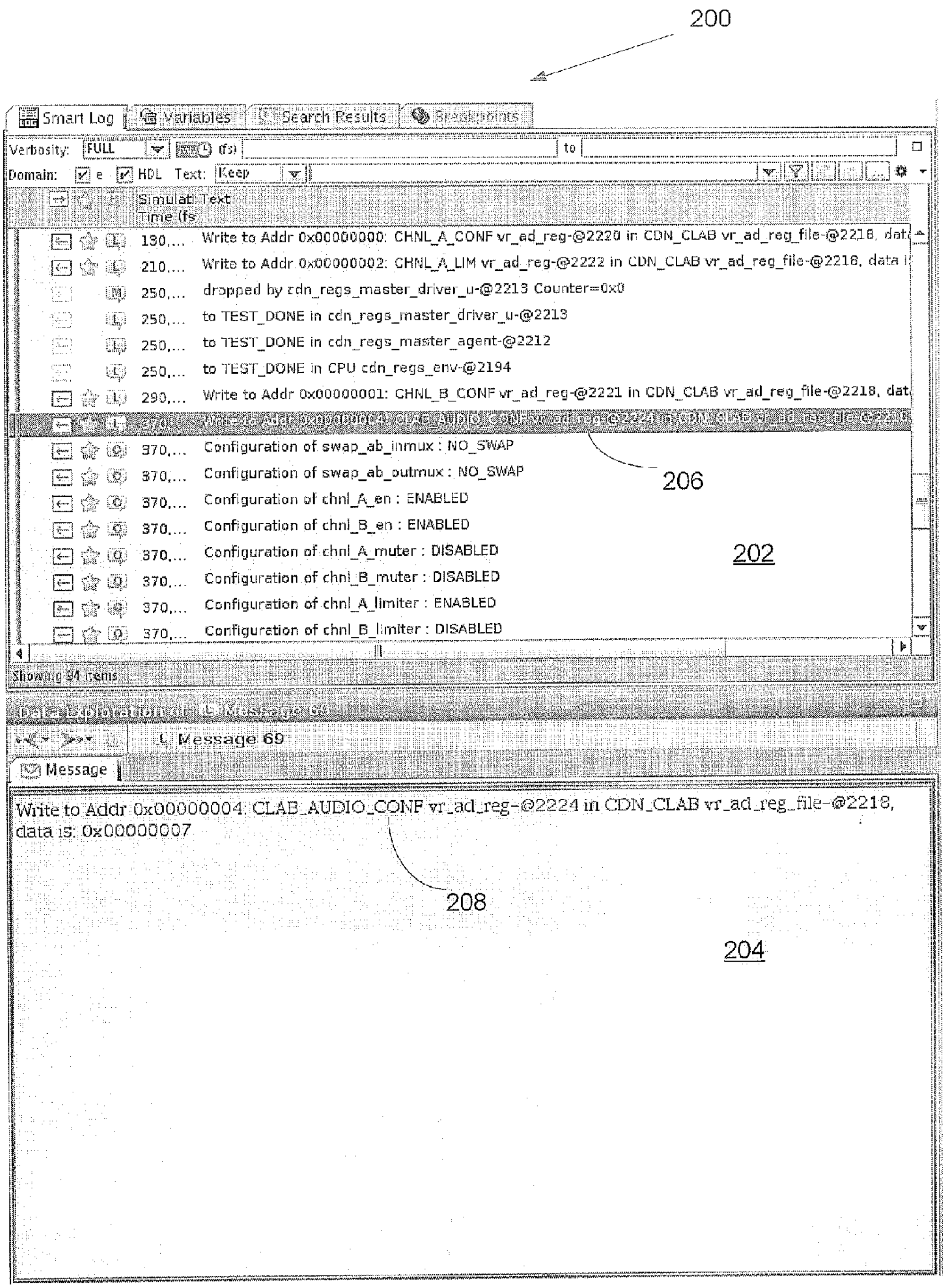
FIG. 2 illustrates a graphical user interface (GUI) of a post process debugger according to an example.

FIG. 2 illustrates a graphical user interface (GUI) of a debugger with enriched message log capability according to an example.

GUI 200 may be include window 202 (the top window in the example shown in this figure) for presenting the messages of a message log that were saved during an execution of a program to be debugged. The debugger with enriched message log capability according to examples may receive a user's selection of a message (e.g. message 206, whose selection is visible by highlighting that message). Upon receiving that selection the content 208 of that message may be presented in a separate window 204.

According to examples the objects in that message (e.g., CLAB_AUDIO_CONF vr_ad_reg-@2224 and CDN_CLAB vr_ad_reg_file-@2218) may be presented so as to allow the user to select any of these objects.

Figure 3:
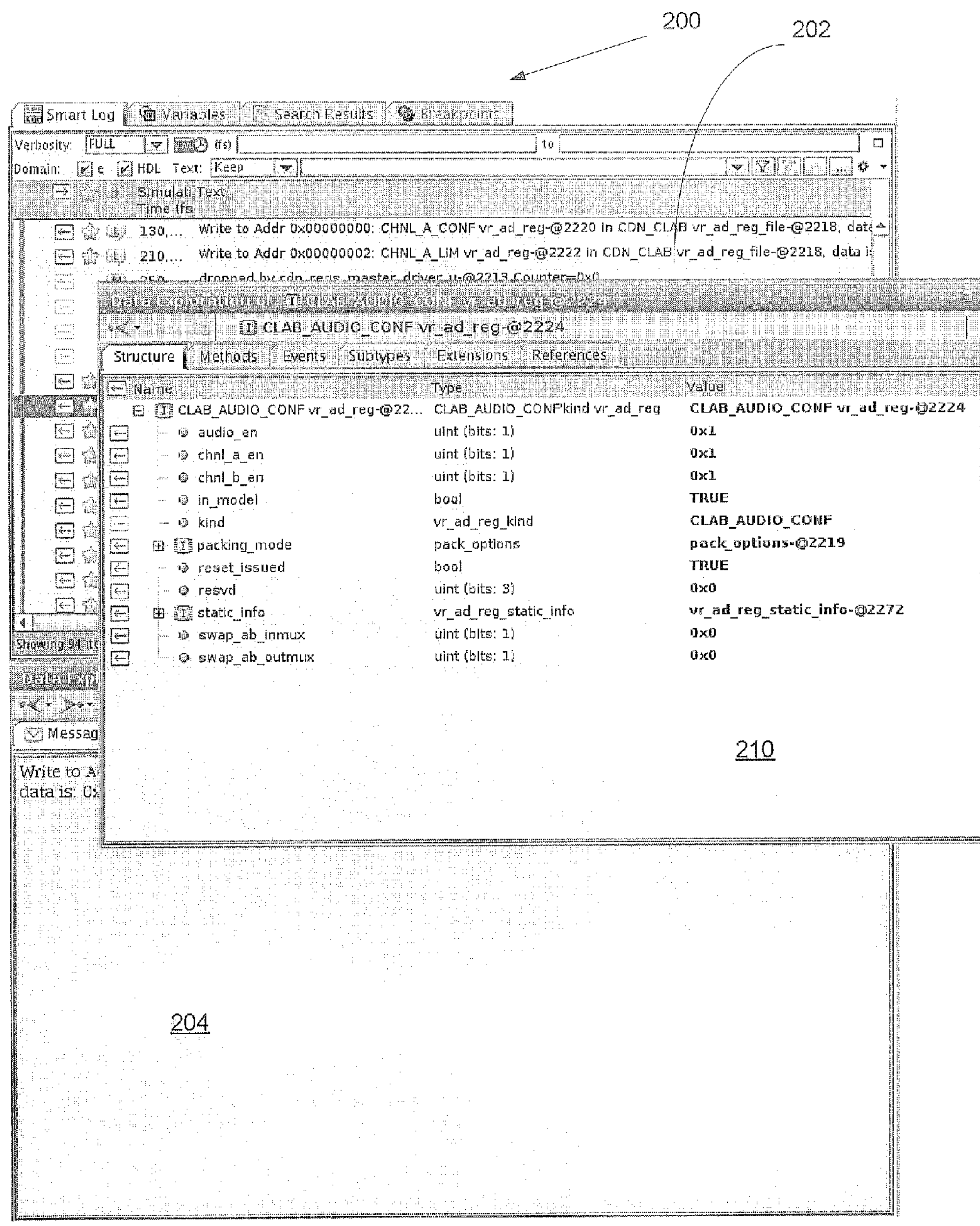
FIG. 3 illustrates a graphical user interface of a post process debugger according to an example with a window showing field values of an object selected by a user from the GUI shown in FIG. 2, according to an example

FIG. 3 illustrates a graphical user interface of a debugger with enriched message log capability according to an example with a window showing field values of an object selected by a user from the GUI shown in FIG. 2, according to an example. Upon selection of an object from the content of a message presented to the user (e.g. in window 204, see FIG. 2) a pop-up window 210 may appear in which information relating to that object may be presented. Specifically such information may include names of fields relating to the selected object (shown in the column under the heading "Names"), types of these fields (in the column under the heading "Type") and values of these fields (in the column under the heading "Value").

In some examples the debugger with enriched message log capability may allow the user to determine whether to record variables and dynamic object information during the recording of an execution of the program being debugged. This may be facilitated, for example by using flags to indicate whether variables and dynamic object information needs to be recorded.

In some examples the debugger with enriched message log capability may allow the user to determine the depth level in which to save dynamic object information. This is important when fields of dynamic objects themselves include dynamic objects, which in turn also include dynamic fields and so on. According to some examples the debugger with enriched message log capability may allow the user to indicate the number of depth levels for which the next level of fields is to be recorded.

Debugging with enriched message log capability according to examples does not require the user to replace existing messages with new message commands. This not only saves time, but may also eliminate or greatly reduce the risk of inputting message code with errors. Furthermore, it also reduces the risk of rerunning again the program without being able to reproduce the same scenario.

Figure 4:
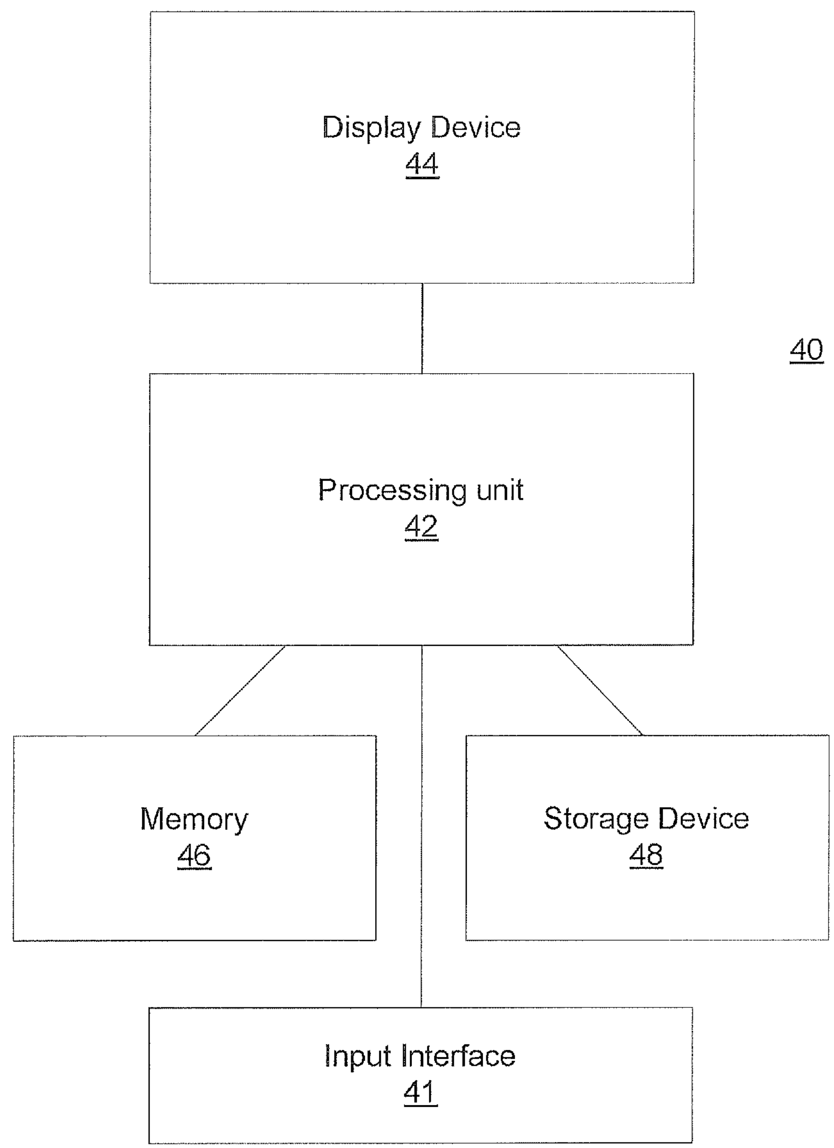
FIG. 4 illustrates a system for debugging according to an example.

FIG. 4 illustrates a system 40 for debugging according to an example.

System 40 may include a processing unit 42 (e.g. one or a plurality of processors, on a single machine or distributed on a plurality of machines) for executing a method according to examples. Processing unit 42 may be linked with memory 46 on which a program implementing a method according to examples and corresponding data may be loaded and run from, and storage device 48, which includes a non-transitory computer readable medium (or mediums) such as, for example, one or a plurality of hard disks, flash memory devices, etc. on which data (e.g. dynamic object information, values of fields, etc.) and a program implementing a method according to examples and corresponding data may be stored. System 40 may further include display device 44 (e.g. CRT, LCD, LED etc.) on which one or a plurality user interfaces associated with a program implementing a method according to examples and corresponding data may be presented. System 40 may also include input device 41, such as, for example, one or a plurality of keyboards, pointing devices, touch sensitive surfaces (e.g. touch sensitive screens), etc. for allowing a user to input commands and data.

Examples may be embodied in the form of a system, a method or a computer program product. Similarly, examples may be embodied as hardware, software or a combination of both. Examples may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Examples are described hereinabove with reference to flowcharts and/or block diagrams depicting methods, systems and computer program products according to various embodiments.

Features of various examples discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the disclosure.

We claim:

1. A computer implemented method comprising:

for each instance during an execution of a program to be debugged in which a message is issued, automatically analyzing the program code included in a scope of the program relating to the message to identify one or a plurality of variables;

saving on a non-transitory computer readable storage medium a value at that instance of each of said one or a plurality of variables;

during off-line debugging, causing a message log that includes the message to be presented on a display device, associating the value of each said one or a plurality of variables with the message; and upon reaching an error message in the execution, recording a value of each field of all dynamic objects in the program.

2. The method of claim 1, wherein said one or a plurality of variables comprise one or a plurality of dynamic objects.

3. The method of claim 1, further comprising, when the value of each of said one or a plurality of variables includes a dynamic object, recording a value of each field of that dynamic object.

4. The method of claim 3, wherein the recording of the value of each field is carried out down to a predetermined depth level.

5. The method of claim 4, further comprising receiving from a user an indication of a depth level.

6. The method of claim 1 further comprising analyzing the message to identify one or a plurality of variables;

saving on a non-transitory computer readable storage medium a value at that instance of each of said one or a plurality of variables; and causing a message log that includes the message to be presented on a display device, associating the value of each said one or a plurality of variables with the message.

7. A non-transitory computer readable storage medium having stored thereon instructions that when executed by a processor will cause the processor to perform the method of:

for each instance during an execution of a program to be debugged in which a message is issued, automatically analyzing the program code included in a scope of the program relating to the message to identify one or a plurality of variables;

saving on a non-transitory computer readable storage medium a value at that instance of each of said one or a plurality of variables;

during off-line debugging, causing a message log that includes the message to be presented on a display device, associating the value of each said one or a plurality of variables with the message; and upon reaching an error message in the execution, recording a value of each field of all dynamic objects in the program.

8. The non-transitory computer readable storage medium of claim 7, wherein said one or a plurality of variables comprise one or a plurality of dynamic objects.

9. The non-transitory computer readable storage medium of claim 7, wherein the instructions further comprise, when the value of each of said one or a plurality of variables includes a dynamic object, recording a value of each field of that dynamic object.

10. The non-transitory computer readable storage medium of claim 9, wherein the instructions are carried out down to a predetermined depth level.

11. The non-transitory computer readable storage medium of claim 10, wherein the instructions further comprise receiving from a user an indication of a depth level.

12. The non-transitory computer readable storage medium of claim 7, wherein the instructions further comprise analyzing the message to identify one or a plurality of variables;

saving on a non-transitory computer readable storage medium a value at that instance of each of said one or a plurality of variables; and causing a message log that includes the message to be presented on a display device, associating the value of each said one or a plurality of variables with the message.

13. A system comprising:

a non-transitory computer readable storage medium; and one or a plurality of processors configured to:

for each instance during an execution of a program to be debugged in which a message is issued, automatically analyze the program code included in a scope of the program relating to the message to identify one or a plurality of variables;

save on the non-transitory computer readable storage medium a value at that instance of each of said one or a plurality of variables;

during off-line debugging, cause a message log that includes the message to be presented on a display device, associating the value of each said one or a plurality of variables with the message; and upon reaching an error message in the execution, record a value of each field of all dynamic objects in the program.

14. The system of claim 13, wherein said one or a plurality of variables comprise one or a plurality of dynamic objects.

15. The system of claim 14, wherein the one or a plurality of processors is further configured, when the value of each of said one or a plurality of variables includes a dynamic object, to record a value of each field of that dynamic object.

16. The system of claim 14, wherein the one or a plurality of processors is configured to record the value for each field down to a predetermined depth level.

17. The system of claim 16, wherein the one or a plurality of processors is further configured to receive from a user an indication of a depth level.

18. The system of claim 13, wherein the one or a plurality of processors is configured when recording the value of each field in the program to be debugged corresponding to the dynamic object at that instance to save that value in a database.

* * * * *